(12) United States Patent
Gao et al.

(10) Patent No.: US 11,884,213 B2
(45) Date of Patent: Jan. 30, 2024

(54) ANTI-GLARE APPARATUS AND MIRROR HAVING LENS ASSEMBLY WITH CONTROLLED OPTICAL AXIS DIRECTION

(71) Applicant: BOE TECHNOLOGY GROUP CO., LTD., Beijing (CN)

(72) Inventors: Shan Gao, Beijing (CN); Ronghua Lan, Beijing (CN); Junrui Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 471 days.

(21) Appl. No.: 16/956,899

(22) PCT Filed: Dec. 6, 2019

(86) PCT No.: PCT/CN2019/123672
§ 371 (c)(1),
(2) Date: Jun. 22, 2020

(87) PCT Pub. No.: WO2020/140692
PCT Pub. Date: Jul. 9, 2020

(65) Prior Publication Data
US 2021/0221292 A1   Jul. 22, 2021

(30) Foreign Application Priority Data
Jan. 2, 2019   (CN) .......................... 201910001420.4

(51) Int. Cl.
*B60R 1/08*      (2006.01)
*G02F 1/133*    (2006.01)
(Continued)

(52) U.S. Cl.
CPC .......... *B60R 1/088* (2013.01); *G02F 1/13306* (2013.01); *G02F 1/134363* (2013.01);
(Continued)

(58) Field of Classification Search
CPC ............................... G02F 1/13306; G02F 1/29
See application file for complete search history.

(56) References Cited

U.S. PATENT DOCUMENTS 9,481,305 B2   11/2016   Kukita
10,137,837 B2   11/2018   Sun et al.
(Continued)

FOREIGN PATENT DOCUMENTS

| CN | 104105620 A | 10/2014 |
| CN | 104656294 A | 5/2015 |

(Continued)

OTHER PUBLICATIONS

Office Action dated Feb. 7, 2020, issued in counterpart CN Application No. 201910001420.4, with English translation (17 pages).
(Continued)

*Primary Examiner* — Lauren Nguyen
(74) *Attorney, Agent, or Firm* — WHDA, LLP

(57) ABSTRACT

An anti-glare apparatus (100), includes a lens assembly (120) having an incident side and a reflective layer (110) on the side of the lens assembly opposite from the incident side. The lens assembly includes a layer of liquid crystal molecules, a first driving electrode (132) and a second driving electrode (131) respectively on both sides of the layer of the liquid crystal molecules; at least one of the first driving electrode or the second driving electrode comprises a plurality of sub-electrodes. The lens assembly is configured to change an optical axis direction of the lens assembly by adjusting a driving voltage of at least one of the plurality of sub-electrodes.

12 Claims, 8 Drawing Sheets

(51) Int. Cl.
*G02F 1/29* (2006.01)
*G02F 1/1343* (2006.01)

(52) U.S. Cl.
CPC .. *G02F 1/134372* (2021.01); *G02F 1/134381* (2021.01); *G02F 1/29* (2013.01); *G02F 2201/58* (2013.01)

(56) References Cited

U.S. PATENT DOCUMENTS

| | | | |
|---|---|---|---|
| 10,281,790 B2 | 5/2019 | Zhu | |
| 2004/0095632 A1 | 5/2004 | Busscher et al. | |
| 2010/0033797 A1* | 2/2010 | Schofield | B60R 1/088 359/267 |
| 2015/0219911 A1* | 8/2015 | Cho | H04N 13/356 349/15 |
| 2017/0001569 A1* | 1/2017 | Sun | G02F 1/137 |
| 2018/0329210 A1 | 11/2018 | Lee et al. | |
| 2019/0351827 A1 | 11/2019 | Xue et al. | |

FOREIGN PATENT DOCUMENTS

| | | | | |
|---|---|---|---|---|
| CN | 106143317 A | | 11/2016 | |
| CN | 10-8162729 | * | 6/2018 | ................ B60J 3/04 |
| CN | 108162729 A | | 6/2018 | |
| CN | 108303812 A | | 7/2018 | |
| CN | 208264117 U | | 12/2018 | |
| CN | 109591704 A | | 4/2019 | |
| JP | 2008044603 A | | 2/2008 | |
| JP | 2016-57541 | * | 4/2016 | ....... G02F 1/134309 |
| WO | 2015045691 A1 | | 4/2015 | |

OTHER PUBLICATIONS

Office Action dated Aug. 3, 2020, issued in counterpart CN Application No. 201910001420.4, with English translation (16 pages).
International Search Report dated Mar. 6, 2020, issued in counterpart Application No. PCT/CN2019/123672 (11 pages).

* cited by examiner

ANTI-GLARE APPARATUS AND MIRROR HAVING LENS ASSEMBLY WITH CONTROLLED OPTICAL AXIS DIRECTION

CROSS-REFERENCE TO RELATED APPLICATIONS

This application claims benefit of the filing date of Chinese Patent Application No. 201910001420.4 filed on Jan. 2, 2019, the disclosure of which is hereby incorporated in its entirety by reference.

TECHNICAL FIELD

The present application relates to the field of optics, and in particular to an anti-glare apparatus and a mirror.

BACKGROUND

In recent years, with rapid spread of automobiles, the driving safety of automobiles has attracted widespread attention. Among many safety hazards, the excessively strong light reflected by the rearview mirror (for example, the light from the nighttime high beam of the car) is particularly concerned. The light of the high beam is very concentrated and the brightness is very high. When the front driver sees the rearview mirror, it is often affected by the glare, thereby causing dizziness in human eyes. The human eyes will form a local blind zone or even a brief blindness, and perception of speed and distance will be reduced, which is likely to cause an accident.

Instant blinding is actually caused by the difference in brightness of the light within a short time to the human eyes. Especially when driving at night, the illumination of the surrounding environment is very low. Under sudden high illumination by the high beam, the difference of the illumination is so large that it is likely to cause instant blindness. People typically use manual or electric methods to adjust the angle of the rearview mirror so that the reflected light is off the eye. However, such an operation has too long reaction time for a light having high intensity, and there is still some reflected light that is capable of making human eyes dizzy into the human eyes, which presents a significant safety hazard.

BRIEF SUMMARY

One embodiment of the present disclosure provides an anti-glare apparatus. The anti-glare apparatus may include a lens assembly having an incident side and a reflective layer on a side of the lens assembly opposite from the incident side. The lens assembly may include a layer of liquid crystal molecules, a first driving electrode and a second driving electrode respectively on both sides of the layer of the liquid crystal molecules, at least one of the first driving electrode or the second driving electrode comprising a plurality of sub-electrodes. The lens assembly may be configured to change an optical axis direction of the lens assembly by adjusting a driving voltage of at least one of the plurality of sub-electrodes.

Optionally, the anti-glare apparatus may further include: a photoreceptor, configured to acquire an intensity signal of an incident light irradiating the incident side of the lens assembly; and a controller electrically connected to the first driving electrode, the second driving electrode, and the photoreceptor. The controller may be configured to adjust the driving voltage of the at least one of the sub-electrodes based on the intensity signal of the incident light to change the optical axis direction of the lens assembly.

Optionally, the controller may be configured to determine whether the intensity signal of the incident light is greater than a threshold value. If the intensity signal of the incident light is greater than the threshold value, the controller may adjust the driving voltage of the at least one of the sub-electrodes to change the optical axis direction of the lens assembly, and otherwise, the controller may control driving voltages of the plurality of sub-electrodes to remain unchanged.

Optionally, the anti-glare apparatus may further include an imaging apparatus. The imaging apparatus may be configured to acquire a human eye's position, and the controller may be further configured to control whether to change the optical axis direction of the lens assembly based on a combination of the intensity signal of the incident light and the human eye's position.

Optionally, the controller may be configured to determine whether the light intensity signal of the lens assembly is greater than the threshold value and whether the human eye's position is in a path of a reflected light of the incident light by the reflective layer. If the light intensity signal of the lens assembly is greater than the threshold value and the human eye's position is in the path of the reflected light of the incident light by the reflective layer, the controller may adjust a driving voltage of the at least one of the sub-electrodes to change the optical axis direction of the lens assembly; and if the light intensity signal does not reach the threshold, and/or the human eye position is not in the path of the reflected light, the controller controls the driving voltages of the sub-electrodes to remain unchanged.

Optionally, the anti-glare apparatus may include a plurality of areas. Each of the plurality of areas may include the lens assembly, and an optical axis of the lens assembly of each of the plurality of areas may be independently adjustable by the controller.

Optionally, the first driving electrode of the lens assembly of each of the plurality of areas may include the plurality of sub-electrodes and the second driving electrode of the lens assembly of each of the plurality of areas merge into an integral driving electrode.

Optionally, the anti-glare apparatus may include at least one photoreceptor in each of the plurality of areas, and the at least one photoreceptor in each area of the anti-glare apparatus may be configured to acquire the intensity signal of the incident light of the lens assembly of the corresponding area.

Optionally, the controller may be configured to control whether to change the optical axis direction of the lens assembly of each area independently based on a combination of the intensity signal of the incident light of the corresponding area and the human eye's position.

Optionally, the controller may be configured to determine whether the light intensity signal of the lens assembly of each area is greater than the threshold value and whether the human eye's position is in a path of the reflected light of the incident light on the lens assembly of each area. If the light intensity signal of the lens assembly of one area is greater than the threshold value and the human eye's position is in the path of the reflected light of the incident light on the lens assembly of the corresponding area, the controller may control to adjust a driving voltage of at least one of the sub-electrodes of the corresponding area to change the optical axis direction of the lens assembly of the corresponding area; and if the light intensity signal of the lens assembly of one area is not greater than the threshold value and/or the human eye's position is not in the path of the reflected light of the incident light on the lens assembly of the corresponding area, the controller may control driving voltages of the sub-electrodes of the corresponding area to remain unchanged.

Optionally, the controller is configured to determine whether the light intensity signal of the lens assembly of each area is greater than the threshold value. If the light intensity signal of the lens assembly of one area is greater than the threshold value, the controller may control to adjust driving voltages of the sub-electrodes of the corresponding area with a first parameter to change the optical axis direction of the lens assembly of the corresponding area. The controller may be then configured to determine whether the human eye's position is in a path of the reflected light of the incident light on the lens assembly of the corresponding area after adjusting the driving voltages. If the human eye's position is in the path of the reflected light of the incident light on the lens assembly of the corresponding area after adjusting the driving voltages, the controller may control to adjust the driving voltages of the sub-electrodes of the corresponding area with a second parameter to change the optical axis direction of the lens assembly of the corresponding area. The first parameter and the second parameter each may include a plurality of driving voltages applied on the plurality of sub-electrodes respectively, and the first parameter may be different from the second parameter.

Another embodiment of the present disclosure provides a mirror. The mirror may include the anti-glare apparatus.

Optionally, the mirror may further include an outer frame and a protective layer and at least a portion of the anti-glare apparatus may be inside an area surrounded by the outer frame and the protective layer.

Optionally, at least a portion of a surface of the outer frame facing the protective layer may be commonly used as the reflective layer of the anti-glare apparatus.

Optionally, the protective layer may be made of a transparent material.

Optionally, the mirror may be an interior rearview mirror, an exterior rearview mirror, or a lower view mirror of a vehicle.

Optionally, the mirror may be a corner mirror.

BRIEF DESCRIPTION OF THE DRAWINGS

The drawings are used to provide a further understanding of the technical solutions of the present disclosure, and constitute a part of the specification, which together with the embodiments of the present disclosure are used to explain the technical solutions of the present disclosure, and do not constitute a limitation of the technical solutions of the present disclosure. Obviously, the drawings in the following description are only some embodiments of the present disclosure, and those skilled in the art can obtain other drawings according to these drawings without any creative work.

DETAILED DESCRIPTION

Figure 1:
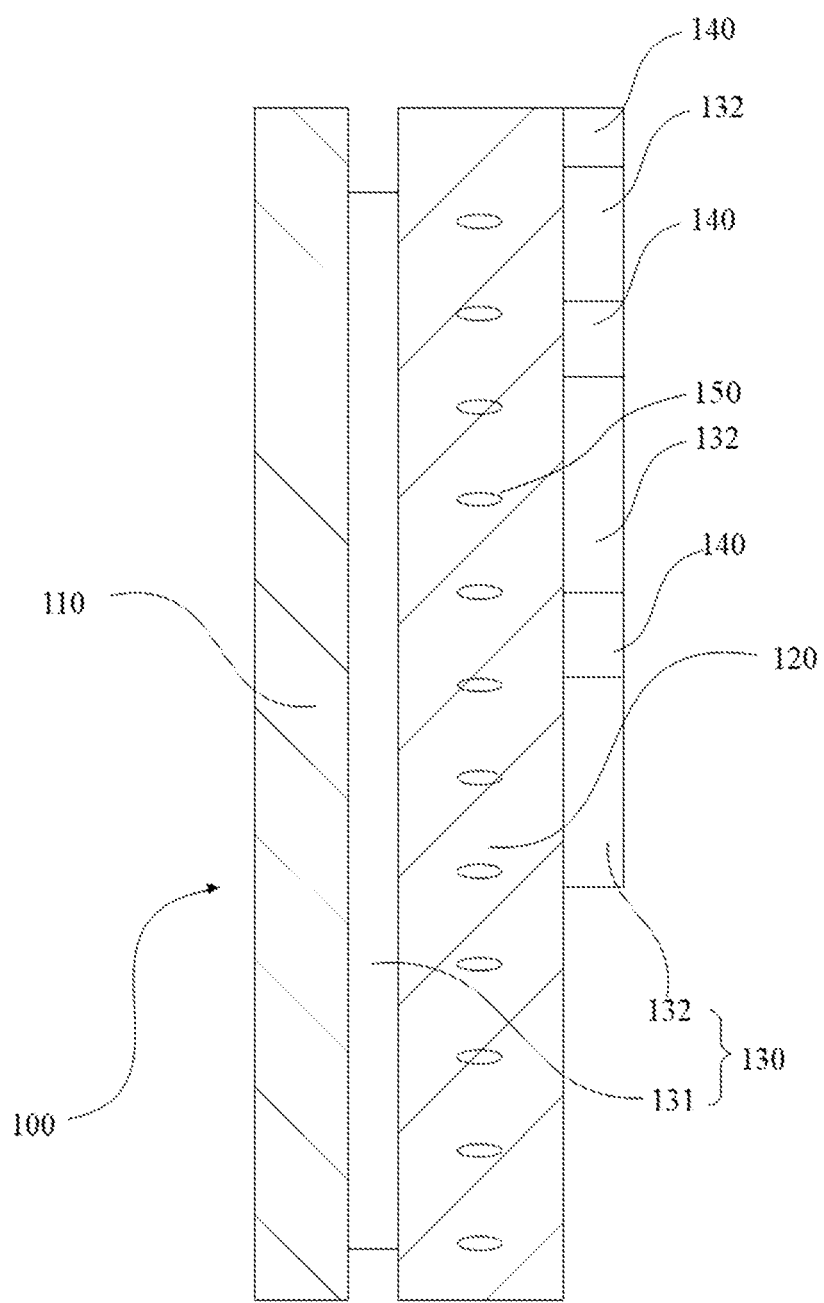
FIG. 1 is a schematic structural view of an anti-glare apparatus according to one embodiment of the present disclosure.

Exemplary embodiments will be described in detail herein, examples of which are illustrated in the accompanying drawings. The following description refers to the same or similar elements in the different figures using the same reference number unless otherwise indicated. The embodiments described in the following exemplary embodiments do not represent all embodiments consistent with the present disclosure. Instead, they are merely examples of apparatus and methods consistent with some aspects of the disclosure as detailed in the appended claims.

The terminology used in the present disclosure is for the purpose of describing particular embodiments, and is not intended to limit the disclosure. The singular forms "a", "the", and "said" used in the present disclosure and appended claims intend to include plural forms unless the context clearly indicates other meanings. It should also be understood that the term "and/or" as used herein refers to and encompasses any and all possible combinations of one or more of the associated listed items.

It should be understand that the words "first," "second" and similar words used in the specification and the claims are not intended to indicate any order, quantity or importance, but only used to distinguish between different components. Similarly, the words "a" or "an" and the like do not denote a quantity limitation, but mean that there is at least one. Unless otherwise indicated, the terms "front", "rear", "lower" and/or "upper" and the like are used for convenience of description and are not limited to one location or one spatial orientation. The words "comprising" or "including" are used to indicate that the components or objects that appear before the word "comprising" or "including" encompass the elements or objects that appear after the word "comprising" or "including" and their equivalents, while other components or objects are not excluded. The words "connected" or "coupled" and the like are not limited to physical or mechanical connections, and may include electrical connections, whether direct or indirect.

The embodiments of the present disclosure are described in detail below with reference to the accompanying drawings. The features of the embodiments described below may be combined with each other without conflict.

As shown in FIGS. 1 through 6B, some embodiments of the present disclosure provide an anti-glare apparatus 100 and a rearview mirror including the same. The rearview mirror referred to here may be a tool for obtaining outer information of a rear side, a lateral side, or a lower side of a vehicle such as a car or a bicycle.

Taking a car as an example, the rearview mirror may be an interior rearview mirror that acquires rear information of the automobile, an exterior rearview mirror that acquires lateral side information of the automobile, or a lower view mirror that acquires information of the lower side of the automobile. When the rear vehicle uses a high beam, or other circumstances make the signals of the incident light from the rear vehicle too strong, the reflected light by the exterior rearview mirror and/or the inner rearview mirror may cause dizziness to human eyes. Similarly, when the light signal of the incident light reflected by the ground is too high, the reflected light by the lower view mirror is likely to cause dizziness to human eyes.

In some embodiments, as shown in FIGS. 1 to 6B, the rearview mirror includes an anti-glare apparatus 100, an outer frame 200, and a protective layer 300.

In one embodiment, as shown in FIG. 1, the anti-glare apparatus 100 includes a reflective layer 110, a lens assembly 120, a photoreceptor 500, and a controller. The lens assembly 120 includes a layer of liquid crystal molecules 150 and drive electrodes 130 on both sides of the layer of liquid crystal molecules 150, and at least one of the drive electrodes includes a plurality of sub-electrodes. The drive electrode 130 is configured to drive the liquid crystal molecules to change their positions to deflect the optical axis of the lens assembly 120. In one embodiment, the driving electrode on one side of the liquid crystal molecules includes a plurality of sub-electrodes to form a first driving electrode, and the driving electrode on the other side serves as a second driving electrode (refer to FIG. 3). By adjusting driving voltages of the second driving electrode and/or the plurality of sub-electrodes of the first driving electrode, the distribution of the horizontal electric field and the vertical electric field between the driving electrodes on both sides can be adjusted, so that the arrangement of the liquid crystal molecules can be changed. Specifically, in a case where a driving voltage is applied between the second driving electrode and the sub-electrodes of the first driving electrode, by controlling the driving voltage, a horizontal electric field is formed between the second driving electrode and the first driving electrode, and a vertical electric field is formed among the plurality of sub-electrodes of the first driving electrode. Under action of the horizontal electric field and the vertical electric field, the liquid crystal molecules in the corresponding areas in the liquid crystal layer are deflected, so that the refractive index of the portion of the liquid crystal layer located in the corresponding areas changes. Thus, by adjusting the driving voltages on the second driving electrode and/or the plurality of sub-electrodes of the first driving electrode (for example, adjusting the driving voltage difference among the three), the distribution of the horizontal electric field and the vertical electric field can be adjusted. Thereby, the deflection of the liquid crystal molecules in the respective areas of the liquid crystal layer is adjusted, thereby adjusting the refractive indices of the respective areas of the liquid crystal layer, that is, the refractive index distribution of the liquid crystal layer can be controlled. Accordingly, the liquid crystal layer can be formed into a liquid crystal lens. Furthermore, by adjusting the driving voltage relationship between adjacent sub-electrodes of the first driving electrode, the distribution of the horizontal electric field can be changed so that the optical axis of the lens assembly can be moved in a direction parallel to the reflective layer.

In one embodiment, the first driving electrode 132 includes three sub-electrodes 133 (refer to FIG. 3), which are a first sub-electrode, a second sub-electrode, and a third sub-electrode, respectively. Of course, in other embodiments, the first drive electrode may include four or more sub-electrodes. The controller is electrically connected to the electrodes 130 and the photoreceptor 140, respectively. Among them, the controller is not shown in FIG. 3. The lens assembly 120 is disposed on a side of the reflective layer 110 that faces the incident light. The reflective layer 110 is disposed on a side of the lens assembly 120 opposite to the incident side of the lens assembly 120 and is configured to reflect incident light transmitted through the lens assembly 120. When a same driving voltage is applied to the first sub-electrode, the second sub-electrode, and the third sub-electrode, there is no horizontal electric field among the first sub-electrode, the second sub-electrode, and the third sub-electrode, and the deflection direction of liquid crystal molecules in each area is the same. That is, the refractive indices of the respective areas are the same and do not have the function of a lens. For example, in the above case, the direction of propagation of light transmitted through the lens assembly does not change.

Figure 3:
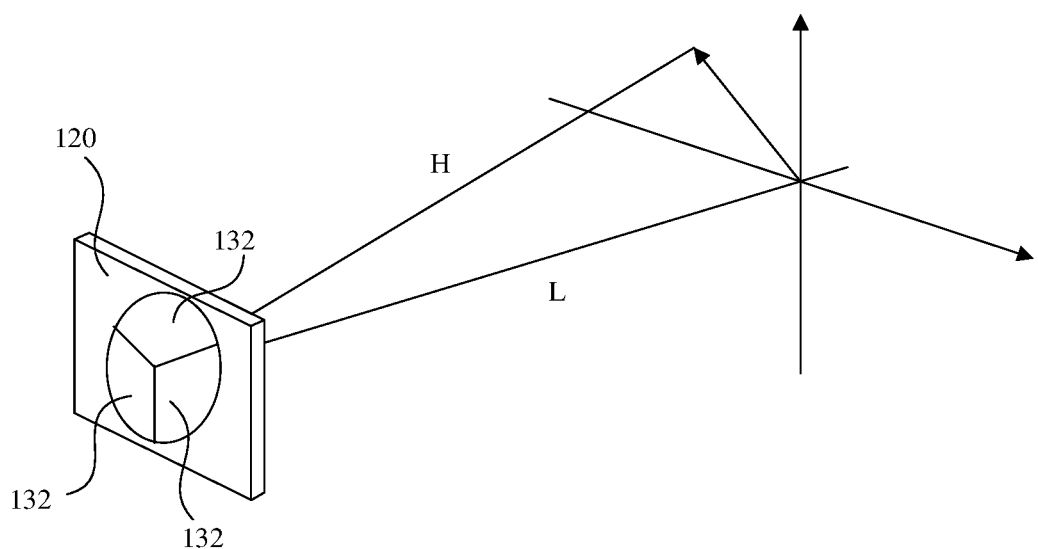
FIG. 3 is a partial structural schematic view of an anti-glare apparatus according to one embodiment of the present disclosure.

In one embodiment, referring to FIG. 3, the plurality of sub-electrodes 133 apply different driving voltages to the liquid crystal molecules such that the positions of the liquid crystal molecules change, and the optical axis of the lens assembly changes. L is the original optical axis, and by applying different driving voltages to the first driving electrode 132, the optical axis is shifted away from the original optical axis L to form a new optical axis H, and H is a new optical axis after the change. The photoreceptor is configured to acquire light intensity signals of an incident light on the lens assembly 120. The controller is configured to adjust the driving voltage of the sub-electrodes according to the light intensity signals to change the optical axis direction of the lens assembly. Among them, the "front" in the text herein refers to the direction near the incident light source, and the "rear" is the direction away from the incident light source.

With such an arrangement, the controller can control whether to change the optical axis of the lens assembly based on the light intensity signal collected by the photoreceptor. When the light intensity signal of the incident light of the lens assembly is too strong, the controller can change the optical axis direction of the lens assembly, thereby changing the path of the reflected light, so that the reflected light having the strong light intensity signal may deviate from human eyes, thereby preventing the reflected light having excessive light intensity signal from entering human eyes and causing dizziness.

In one embodiment, the controller is configured to determine whether the light intensity signal of the incident light is greater than a threshold value. If so, the controller controls the sub-electrodes of the first driving electrode to change the driving voltages so as to change the optical axis of the lens assembly. As a result, the reflected light corresponding to the incident light may deviate from the human eyes. If not, the controller controls the sub-electrodes of the first driving electrode to remain in the original state. As a result, the reflected light is away from the lens assembly in the original path. In this way, it is avoided that the incident light whose intensity signals are too strong enters the human eyes and causes dizziness. The user can adjust the threshold value according to the actual situation. Moreover, in one embodiment, the driving voltage of the second driving electrode is always a fixed value, and the driving voltage of the first driving electrode can be changed under control of the controller.

Figure 2:
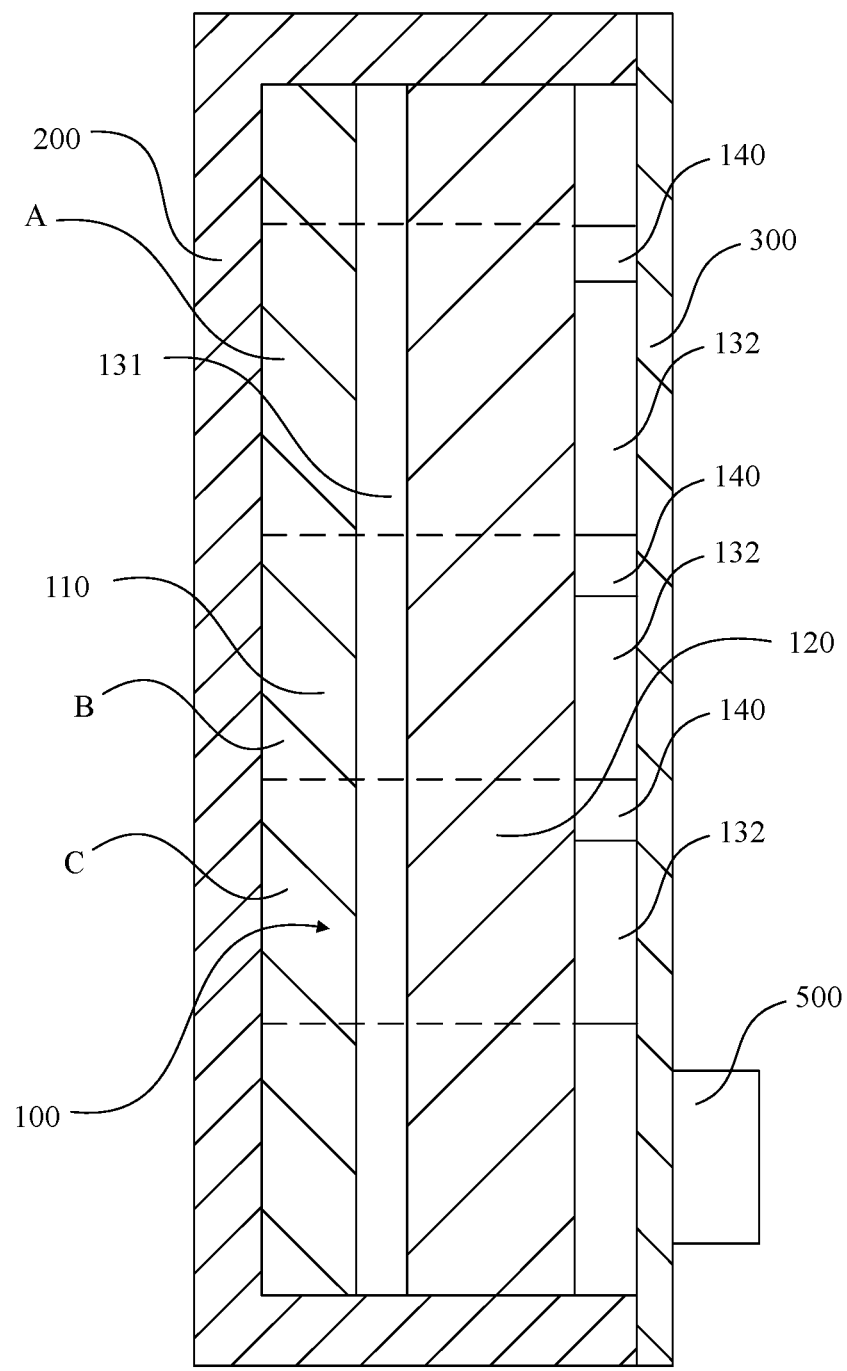
FIG. 2 is a schematic structural view of a rearview mirror according to one embodiment of the present disclosure.

In one embodiment, as shown in FIG. 2, FIG. 4 to FIG. 6B, the anti-glare apparatus 100 has a plurality of areas, each of which is provided with one or more lens assemblies 120, and the optical axis of the lens assembly 120 of each area can be oscillated independently of the lens assemblies of other areas. Also, the lens assemblies 120 of different areas may share the same second driving electrode 131. There may be a plurality of photoreceptors 140, and the lens assembly 120 of each area is correspondingly configured with at least one photoreceptor 140. As shown in FIG. 2, the anti-glare apparatus 100 can be divided into a first area, a second area, and a third area. The first area is the A area shown in the figure, the second area is the B area shown in the figure, and the third area is the C area shown in the figure. In this way, control of the sub-areas of the anti-glare apparatus 100 can be achieved. The controller can apply different drive voltages to the sub-electrodes of the first drive electrode 132 of the lens assembly 120 at different areas to change the optical axis direction of the lens assembly 120 of different areas. When the light intensity signal of the incident light in any one area of the anti-glare apparatus 100 is too strong, only the optical axis of the lens assembly 120 of the area may be changed such that the reflected light of the area deviates from the human eyes 400, while the incident light in other areas can still be reflected into the human eyes 400 normally, so that the user can see the rear information.

In one embodiment, the anti-glare apparatus 100 also includes an imaging apparatus 500 that is configured to capture a position of human eyes. The controller is further configured to control whether a different driving voltage is applied to the sub-electrodes of the first driving electrode 132 to change the optical axis of the lens assembly based on the position of the human eyes. With such an arrangement, the controller can control whether to change the optical axis direction of the lens assembly of the corresponding area based on the position of the human eye and the incident light intensity signal of each area, which makes the control more precise. In one embodiment, the imaging apparatus 500 collects the position of the human eyes of the driver, which is specifically the position coordinates of the human eyes of the driver. The photoreceptor also captures the incident angle of the incident light. The controller can obtain a reflection path of the reflected light, that is, a reflection vector, according to the incident angle of the incident light. The controller then determines if the position coordinates of the human eye are on the reflection vector. If the position coordinates of the human eye are on the reflection vector, it means that the reflected light will enter the human eye. That is, the human eyes are located in the path of reflected light of the lens assembly of the area. If the position coordinates of the human eye are not located on the reflection vector, it means that the reflected light does not enter the human eyes. That is, the human eyes are not located in the path of the reflected light of the lens assembly of the area. In this way, it can be determined whether the reflected light corresponding to the incident light having the light intensity signal greater than the threshold value would enter the human eyes to cause the driver to be blinded by glare.

In some embodiment, the imaging apparatus 500 may not be provided. Taking the interior rearview mirror of the automobile as an example, the photoreceptor detects the light intensity signal of the incident light of the lens assembly of each area. When the controller detects that the light intensity signal of a certain area is too strong, a driving voltage is applied to the corresponding first driving electrode of the lens assembly of the area, so that the optical axis of the lens assembly of the area changes. For example, in this case, the optical axis of the lens assembly can be changed such that the reflected light propagates toward the direction of the roof or toward other directions away from the driver (eg, the direction of the passenger seat), so that, in most cases, the driver's eye position can be avoided. As a result, the driver can be prevented from appearing dizzy to blind, thereby ensuring driving safety.

In some embodiments, when the anti-glare apparatus 100 is configured with the imaging apparatus 500 capable of detecting the position of the human eyes, the controller determines whether the light intensity signal of the lens assembly 120 of each area is greater than a threshold value, and determines whether the position of the human eye is located in the path of the reflected light of the lens assembly 120 of the area. If the light intensity signal reaches the threshold and the human eye position is in the path of the reflected light, the controller controls the sub-electrode of the first driving electrode 132 of the area to change the driving voltage. Thereby, the positions of the liquid crystal molecules are changed, and the optical axis of the lens assembly 120 is swung. If the light intensity signal does not reach the threshold value, the controller controls the sub-electrodes of the first drive electrode 132 to remain in the original state. The reflected light still exits the lens assembly 120 in the original path. When the anti-glare apparatus 100 enters the operational state, the imaging apparatus can capture the driver's eye position in real time. In general, when the car starts to travel, the anti-glare apparatus 100 is regarded as entering the operational state. Of course, it is also possible that the imaging apparatus acquires the position of the driver's eye position before driving, and uses the driver's eye position as the position of the human eye used by the controller in the current operational state.

In one embodiment, the controller can have various control methods for changing the optical axis, as shown in FIGS. 4 to 6B. It is assumed that the adjacent three areas: the light intensity signals of the incident light at the A area, the B area, and the C area are all larger than the threshold, and only the path of the original reflected light corresponding to the incident light at the A area passes through the human eye 400 (The dotted light path in FIGS. 4 to 6B indicates the path of the original reflected light of each area).

In one embodiment, the controller only changes the optical axis of the lens assembly 120 of one area where the light intensity signal of the incident light of the lens assembly 120 reaches a threshold value and the human eye position is located in the original path of the reflected light.

Figure 4:
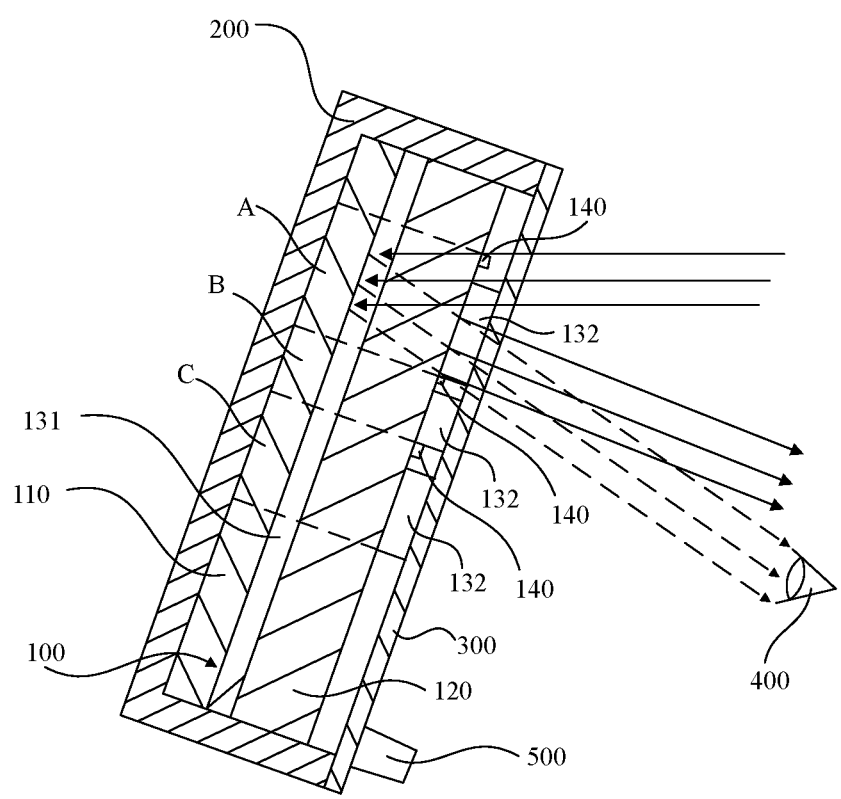
FIG. 4 is a schematic structural view showing a controller changing an optical axis direction of an area A of an anti-glare apparatus according to one embodiment of the present disclosure.

In this manner, referring to FIG. 4, the photoreceptor of each area collects the light intensity signal of the incident light in the area, and the controller determines whether the light intensity signal of the incident light of the lens assembly 120 of the area reaches the threshold value, and determines whether the human eye position is located in the original path of the reflected light of the lens assembly 120 of the area. If yes, that is, the light intensity signal reaches the threshold value, and the human eye position is located in the path of the reflected light (as shown in the A area of FIG. 4), the controller controls the sub-electrodes of the first driving electrode 132 of the area (A area) to change its driven voltage. As a result, the positions of the liquid crystal molecules are changed such that the optical axis of the lens assembly 120 changes in swing. At this time, the path of the reflected light changes and deviates from the human eye. If not, that is, if when the light intensity signal does not reach the threshold value, and/or when the human eye position is not located in the path of the reflected light (as shown in the B area and the C area in FIG. 4), the controller controls the sub-electrodes of the first drive electrode 132 of the area to maintain the original state, and the reflected light is away from the lens assembly 120 along the original optical path.

In one embodiment, the controller applies a driving voltage only to the first driving electrode corresponding to the lens assembly 120 of the A area to change the optical axis of the lens assembly 120 of the A area. The path of the reflected light of the lens assembly 120 at the A area is changed from the position of the dotted optical path to the position of the solid optical path, as shown in FIG. 4, so as to deviate from the human eye 400.

Alternatively, the controller changes the optical axis of the lens assembly 120 of any area where the intensity signal of the incident light is greater than a threshold value. In other words, if the light intensity signal of the incident light of the lens assembly 120 of any one area is too strong, that is, when the threshold is reached, regardless of whether the human eye position is in the path of the original reflected light of the lens assembly 120 of the area, the optical axis of the lens assembly 120 of the area is changed.

Figure 5A:
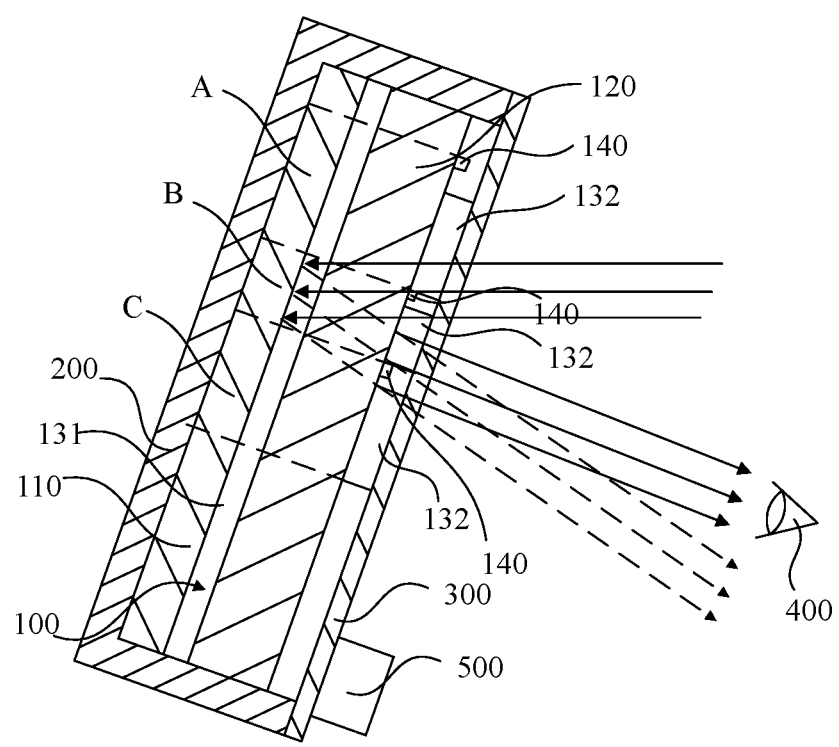
FIG. 5A is a schematic structural view showing a controller changing an optical axis direction of an area B of an anti-glare apparatus according to one embodiment of the present disclosure.
Figure 5B:
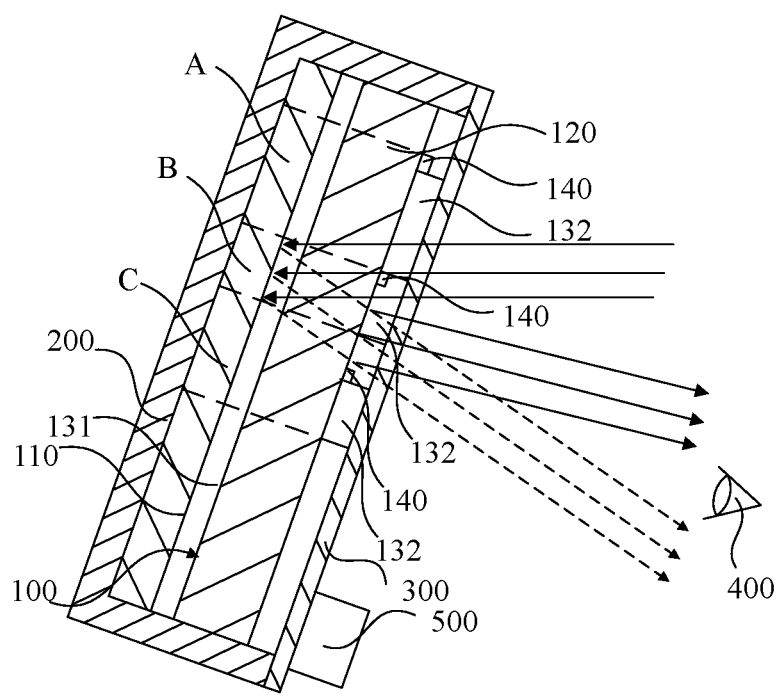
FIG. 5B is a schematic structural view showing a controller changing an optical axis direction of an area B of an anti-glare apparatus according to one embodiment of the present disclosure.
Figure 6A:
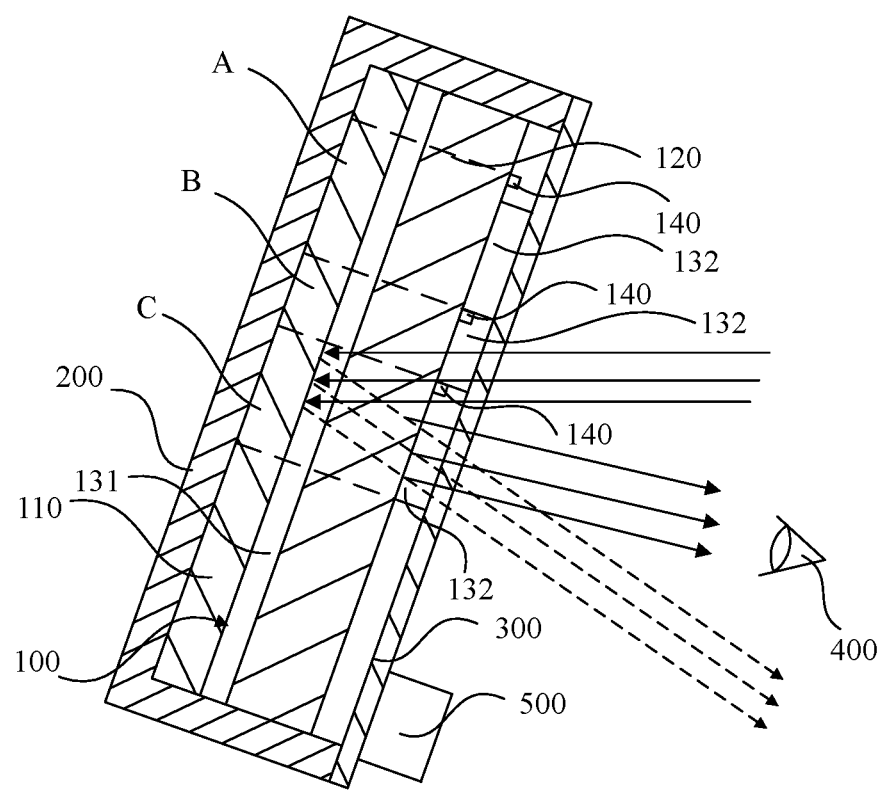
FIG. 6A is a schematic structural view showing a controller changing an optical axis direction of an area C of an anti-glare apparatus according to one embodiment of the present disclosure.
Figure 6B:
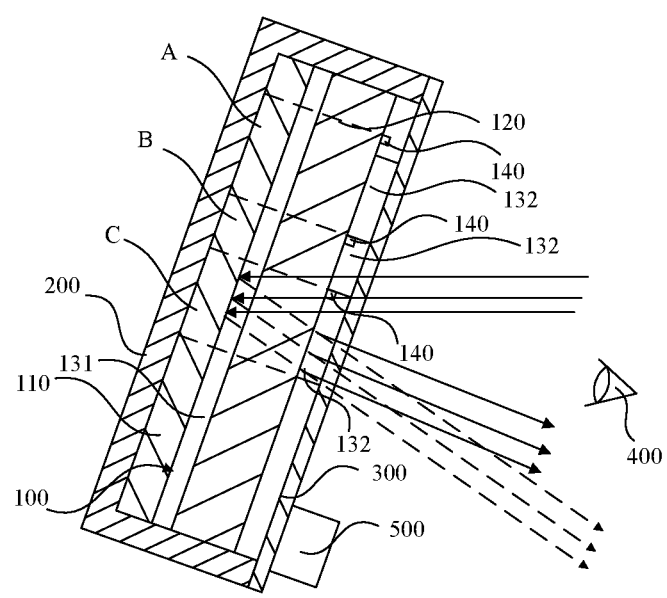
FIG. 6B is a schematic structural view showing a controller changing an optical axis direction of an area C of an anti-glare apparatus according to one embodiment of the present disclosure.

In this manner, referring to FIG. 5A and FIG. 5B, the photoreceptor of each area collects the light intensity signal of the incident light of the area. The controller determines whether the light intensity signal of the lens assembly 120 of the area is greater than a threshold value, and determines whether the human eye position is located in the path of the reflected light of the lens assembly 120 of the corresponding area. If the light intensity signal reaches the threshold value and the human eye position is in the path of the reflected light, the controller controls the first driving electrode 132 of the area to change the position of the liquid crystal molecules with the driving voltage of a first parameter such that the optical axis and the focus position of the lens assembly 120 change. If the light intensity signal reaches the threshold and the position of the human eye is not located in the path of the reflected light, the controller determines whether the first driving electrode 132 changes the positions of the liquid crystal molecules with the driving voltage of the first parameter such that the optical axis of the lens assembly 120 changes, and whether the position of the human eye is located in the path of the reflected light after being changed. If so (as shown by the B area in FIG. 5A), the controller controls the first driving electrode of the area to change the positions of the liquid crystal molecules with a second parameter so that the optical axis of the lens assembly 120 changes. As a result, the position of the human eye is not located in the path of the reflected light after being changed (as shown by the B area in FIG. 5B). If not, the first drive electrode changes the position of the liquid crystal molecules with the first parameter to change the optical axis of the lens assembly 120. The first parameter is not equal to the second parameter. If the light intensity signal does not reach the threshold value, the controller controls the first drive electrode of the area to remain in the original state, and the reflected light travels away from the lens assembly 120 along the original optical path and the lens assembly 120 maintains the original focus position. The first parameter and the second parameter each may be a combination of a plurality of values. In one embodiment, the first driving electrode of the lens assembly of each area includes three sub-electrodes, and the driving voltage of each sub-electrode is different. Therefore, the first parameter and the second parameter each include values of three driving voltages, which are respectively assigned to the three sub-electrodes.

In one embodiment, as shown in FIG. 4 to FIG. 6A and FIG. 6B, referring to FIG. 3 as necessary, the controller controls applying driving voltages $V_{A1}$, $V_{A2}$, anal $V_{A3}$ to the three sub-electrodes of the first driving electrode 132 corresponding to the lens assembly 120 of each of the A area, the B area, and the C area to change the positions of the liquid crystal molecules of the A area. Thereby, the optical axis of the lens assembly 120 is changed, and the path of the reflected light of the lens assembly 120 at the A area is changed to deviate from the human eye 400 (as shown in FIG. 4). Wherein, $V_{A1}$, $V_{A2}$, and $V_{A3}$ are the first parameter. The controller determines that if the first driving electrodes 132 of the A area, the B area, and the C area are controlled to apply to the three sub-electrodes of the first driving electrode 132 of the corresponding area with the same driving voltages $V_{A1}$, $V_{A2}$, and $V_{A3}$, the excessively reflected light from the B area passes through the human eye (as shown by the reflected light in the B area of FIG. 5A). Then, the controller controls the first driving electrode 132 located in the B area to apply the driving voltages $V_{B1}$, $V_{B2}$, anal $V_{B3}$ to the liquid crystal molecules in the B area, which are different from the driving voltages $V_{A1}$, $V_{A2}$, and $V_{A3}$, so that the reflected light is caused to deviate from the human eye 400 (as shown by the reflected light in the B area of FIG. 5B). Wherein, $V_{B1}$, $V_{B2}$, and $V_{B3}$ are the second parameter. In this embodiment, the controller further determines that if the $V_{B1}$, $V_{B2}$, and $V_{B3}$ are applied to the three sub-electrodes of the first driving electrode 132 corresponding to the B area and the C area, the excessively strong reflected light of the C area passes through the human eye 400 (As shown by the reflected light in the C area in FIG. 6B). If so, the controller applies driving voltages $V_{C1}$, $V_{C2}$, and $V_{C3}$ to the three sub-electrodes of the first driving electrode 132 of the C area, and the driving voltages $V_{C1}$, $V_{C2}$, and $V_{C3}$ are different from the driving voltages $V_{B1}$, $V_{B2}$, and $V_{B3}$ so that the reflected light in the C area deviates from the human eye 400 (as shown by the reflected light in the C area in FIG. 5B). Of course, if the controller applies the driving voltages $V_{A1}$, $V_{A2}$, and $V_{A3}$ to the three sub-electrodes of the first driving electrode 132 of the C area and cause the reflected light of the C area does not pass through the human eye 400, it is also possible to apply driving voltages $V_{A1}$, $V_{A2}$, and $V_{A3}$ to the three sub-electrons of the first driving electrode 132 of the C area.

In one embodiment, as shown in FIG. 2, the outer frame 200 of the rearview mirror is recessed inward, and the protective layer 300 is fixed on a surface of the outer frame 200 provided with the recess. At least a portion of the anti-glare apparatus 100 is fixed inside the area surrounded by the protective layer 300 and the outer frame 200. In one embodiment, as shown in FIG. 2, the lens assembly 120, the reflective layer 110 and the photoreceptor 140 are both fixed inside the area surrounded by the protective layer 300 and the outer frame 200. With such an arrangement, the outer frame 200 and the protective layer 300 isolate the anti-glare apparatus 100 from the outside environment, thereby protecting the lens assembly 120. Furthermore, the interference of external impurities on the photoreceptor 140, the first driving electrode 132, and the second driving electrode 131 is prevented so that the process of detection and control is more accurate. That is, the fixing and protection of the anti-glare apparatus 100 is achieved at the same time. Of course, in other embodiments, the rearview mirror may not be provided with the outer frame 200 and the protective layer 300, and only the anti-glare apparatus 100 forms the rearview mirror or at least part of the rearview mirror.

In one embodiment, the protective layer 300 and the outer frame 200 are two different components. Of course, the reflective layer may not be separately provided. Instead, at least a portion of the surface of the outer frame 200 opposite the protective layer 300 may form the reflective layer 110. As such, the process can be simplified or the thickness of the mirror can be further reduced.

In one embodiment, the protective layer 300 is made of a transparent material. Such an arrangement may prevent changing the judgment of the human eye on the light path due to the protective layer 300.

In one embodiment, when the rearview mirror is mounted, the protective layer 300 is disposed in a position which is in a direction closer to the incident light source than the outer frame 200, so that the incident light can enter the lens assembly 120 through the protective layer 300, and then reflected by the reflective layer 110 to enter the human eye.

In the prior art, one type of rearview mirror that may divide the lens assembly into a specular reflection portion having a high reflectance and a transflective portion having a low reflectance is also used. By adjusting the angle of the rearview mirror, the rearview mirror can be adjusted from the specular reflection portion to the transflective portion to reduce the amount of light entering the human eye. However, the response time is long, and the manual adjustment easily causes errors and distracts the driver. The rearview mirror according to one embodiment of the present disclosure has a faster response time than the current rearview mirror, and requires no manual adjustment and is more precise. Another type of rearview mirror in the prior art is a color-changing rearview mirror that reduces the transmittance of light by changing the color of the intermediate color-changing layer in the rearview mirror. However, such a rearview mirror has a complicated structure, a large volume, and a slow response time to strong light. The rearview mirror according to one embodiment of the present disclosure is lighter and thinner than the rearview mirror in the prior art and has a fast reaction time, which is beneficial to the driving safety. Another type of the existing rearview mirror is a light-absorbing rearview mirror that filters strong light. The rearview mirror according to one embodiment of the present disclosure is brighter than the existing rearview mirror, which is advantageous for driving safety.

In addition, the anti-glare apparatus in the present disclosure can be applied not only to the rearview mirror but also to other reflective apparatus, such as a corner mirror on a road, a makeup mirror, and the like. When the corner mirror includes the anti-glare apparatus described above, the anti-glare apparatus in the corner mirror can change the optical axis of the lens assembly. The incident light whose intensity signal is too strong is reflected upward to a height that the driver's human eye usually cannot reach, so that the driver of the passing vehicle does not have dizziness caused by the strong light intensity signal entering the human eye, thereby improving driving safety of the passing vehicles.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. An anti-glare apparatus, comprising:
   a lens assembly having an incident side, the lens assembly comprising a layer of liquid crystal molecules, a first driving electrode and a second driving electrode respectively on both sides of the layer of the liquid crystal molecules, the first driving electrode comprising a plurality of sub-electrodes; and
   a reflective layer on a side of the lens assembly opposite from the incident side;
   a photoreceptor, configured to acquire an intensity signal of incident light irradiating the incident side of the lens assembly; and
   a controller electrically connected to the first driving electrode, the second driving electrode, and the photoreceptor and configured to adjust driving voltages of the sub-electrodes based on the intensity signal of the incident light to change an optical axis direction of the lens assembly;
   wherein the anti-glare apparatus includes a plurality of areas, each of the plurality of areas comprises the lens assembly, and the optical axis of the lens assembly of each of the plurality of areas is independently adjustable by the controller;
   the anti-glare apparatus further includes an imaging apparatus, the imaging apparatus is configured to acquire a human eye's position, and the controller is further configured to control whether to change the optical axis direction of the lens assembly based on a combination of the intensity signal of the incident light and the human eye's position;
   the anti-glare apparatus includes at least one photoreceptor in each of the plurality of areas, and the at least one photoreceptor in each area of the anti-glare apparatus is configured to acquire the intensity signal of the incident light of the lens assembly of a corresponding area;
   the controller is configured to determine whether the light intensity signal of the lens assembly of each area is greater than the threshold value and whether the human eye's position is in a path of the reflected light of the incident light on the lens assembly of each area;
   the controller controls to change the optical axis direction of the lens assembly of the corresponding area in response that the light intensity signal of the lens assembly of one area is greater than the threshold value and the human eye's position is in a path of reflected light of the incident light on the lens assembly of the corresponding area;
   the controller controls to adjust the driving voltages of the sub-electrodes of the corresponding area with a first parameter to change the optical axis direction of the lens assembly of the corresponding area in response that the light intensity signal of the lens assembly of one area is greater than the threshold value;
   the controller controls to adjust the driving voltages of the sub-electrodes of the corresponding area with a second parameter to change the optical axis direction of the lens assembly of the corresponding area in response that the human eye's position is in the path of the reflected light of the incident light on the lens assembly of the corresponding area after adjusting the driving voltages with the first parameter; and
   the first parameter and the second parameter each comprise a plurality of driving voltages applied on the plurality of sub-electrodes respectively, and the first parameter is different from the second parameter.

2. The anti-glare apparatus according to claim 1, wherein the first driving electrode of the lens assembly of each of the plurality of areas comprises the plurality of sub-electrodes and the second driving electrode of the lens assembly of each of the plurality of areas merge into an integral driving electrode.

3. The anti-glare apparatus according to claim 1, wherein the controller is configured to control whether to change the optical axis direction of the lens assembly of each area independently based on a combination of the intensity signal of the incident light of the corresponding area and the human eye's position.

4. The anti-glare apparatus according to claim 1, wherein the controller controls the driving voltages of the sub-electrodes of the corresponding area to remain unchanged in response that the light intensity signal of the lens assembly of one area is not greater than the threshold value and/or the human eye's position is not in a path of the reflected light of the incident light on the lens assembly of the corresponding area.

5. A mirror, comprising the anti-glare apparatus according to claim 1.

6. The mirror according to claim 5, further comprising an outer frame and a protective layer, and at least a portion of the anti-glare apparatus is inside an area surrounded by the outer frame and the protective layer.

7. The mirror according to claim 6, wherein at least a portion of a surface of the outer frame facing the protective layer is commonly used as the reflective layer of the anti-glare apparatus.

8. The mirror according to claim 7, wherein the protective layer is made of a transparent material.

9. The mirror according to claim 1, wherein the mirror is an interior rearview mirror, an exterior rearview mirror, or a lower view mirror of a vehicle.

10. The mirror according to claim 1, wherein the mirror is a corner mirror.

11. The anti-glare apparatus according to claim 1, wherein the lens assembly is configured to change the optical axis direction of the lens assembly by adjusting a distribution of a horizontal electric field and a vertical electric field, the horizontal electric field is formed between the second driving electrode and the first driving electrode, and the vertical electric field is formed among the plurality of sub-electrodes of the first driving electrode.

12. The anti-glare apparatus according to claim 1, wherein each of the plurality of sub-electrodes has a fan-shape, applying a same driving voltage to the plurality of sub-electrodes maintains a same deflection direction of the liquid crystal molecules, and applying different driving voltages to the plurality of sub-electrodes shifts an original optical axis to form a new optical axis of the lens assembly.

* * * * *